Sept. 5, 1967 TAKUJI EZOE ETAL 3,339,368
APPARATUS FOR LAYING UNDERWATER CABLES
Filed Sept. 27, 1965 6 Sheets-Sheet 1

United States Patent Office 3,339,368
Patented Sept. 5, 1967

3,339,368
APPARATUS FOR LAYING UNDERWATER CABLES
Takuji Ezoe, 1089 8-chome, Koyama, Skinagawa-ku, Tokyo-to, Japan, and Kikuo Shirai, 1791 Kanekomachi, Chofu-shi, Tokyo-to, Japan
Filed Sept. 27, 1965, Ser. No. 490,283
Claims priority, application Japan, Sept. 28, 1964, 39/54,498
26 Claims. (Cl. 61—72.4)

This invention relates to an apparatus for laying underwater cables and more particularly to an apparatus for digging a trench or ditch in the bottom of a body of water and, at the same time, laying at least one underwater cable or conduit in the trench.

The placement of communication and power cables and conduits across oceans, rivers, lakes and harbours is a problem of long standing in the utility field. There are presently four methods generally employed in making water crossings of cables and conduits. Normally, these are overhead suspension on towers or poles, support on bridges, placement on the bottom of the body of water, and embedment below the bottom surface. Overhead crossings are expensive, particularly where weight per unit length is high and the ground supporting the towers is soft and often swampy. Furthermore, towers are usually a hazard to air traffic and are always vulnerable to damage by the elements. Bridges are not in all cases conveniently available and modern bridges, particularly those of longer span, are relatively flexible. This flexibility has been the cause of damage to many cables attached to bridges. Moreover, heavy cables add to the load factor on the bridge and increase its cost in certain cases. Said two methods, i.e. overhead suspension and support on bridges, cannot be applied in the case of crossing oceans.

Except where the water is extremely deep, cables and pipelines resting on the bottom of bodies of water are subject to damage by anchors dropped by ships, vessels, and by fishing nets. Disturbances caused by storms, tides and stream currents also place excessive stresses and strains on the submerged cables.

The safest installation, therefore, is burial of the cable or conduit below the surface of the bottom of the body of water. When buried properly, the cable or conduit is well protected and supported so that it is always free from any stress or strain. This is extremely important for some of the more complex cables. The use of plastic conduits is increasing, and such conduits must be buried because of their buoyancy and need for protection from mechanical damage. It is generally recognized, for this reason, that there is a real need for a reliable method of embedding cables and conduits in the bottom soil at a suitable distance below the surface of the bottom of waters of all crossings.

There have been heretofore proposed two apparatuses for such embedding of cables and conduits. One such apparatus is the so-called "Hydro-Jet" which is provided with an ejector including a high-pressure water section and a guide section for the cable, conduit or pipe, this apparatus digging a trench by employing high-pressure water and laying the cable, conduit, or pipe guided through the guide section into the trench. The other apparatus is composed of a tube-shaped body having small projections which are arranged on the surface of the body, a cable guided through the body laid in a trench formed, by pulling the body, in the bottom of the body of water. The former apparatus requires an ejector feeding water at high pressure through a large hose from a pump mounted on a cable laying barge. Because of the necessity to feed high-pressure water, application of the former apparatus is limited to laying the cable on sea bottoms where the body of water above has a depth less than approximately eighty feet. In order to increase the depth to which this apparatus can be applied, a submerged pump may be mounted on a cable layer pulled along the bottom. In this case, however, it is necessary to supply power to the submerged pump and to protect the apparatus from the high pressure of the deep body of water. As a result of such construction, it is very difficult for the former apparatus to be applied on the bottom of a body of water deeper than one hundred feet. Moreover, because of the slow speed of digging the trench with the high-pressure water, the speed of the apparatus in laying a cable or conduit is relatively slow. On the other hand, the latter apparatus digs the ditch by pressure due to the weight of the tube-shaped body and by the travelling of said projections attached on the surface of the tube-shaped body. Accordingly, forming of the trench by the latter apparatus is not carried out completely with respect to excavation of the trench and particularly to removal of the soil so loosened. If the weight of the tube-shaped body is increased to form the trench with a depth below an appropriate distance from the surface of the bottom, extremely large energy will be necessary to pull the apparatus.

An object of the present invention is to provide an apparatus for laying and burying underwater cables or conduits without the above described disadvantages in the bottom of the body of water.

According to the present invention there is provided an apparatus for laying an underwater cable (or conduit), comprising a pipe employed for passing therethrough a cable (or conduit), and composed of, with respect to the longitudinal direction thereof, a plurality of divided bodies, joint means for employing successively to connect said divided bodies to one another with flexible couplings without rotatability with respect to the axis of the pipe, each of the couplings having a hollow to pass the cable, a plurality of pairs of plough blades, one blade and the other blade of each pair of which are respectively attached to the two sides of said divided bodies so as to be symmetrical to each other with respect to a plane which passes through the axis of the pipe and divides the pipe into two equal parts, each of the plurality of blades having an angle of sweepback with respect to the axial direction, from the forward end of the pipe, of the respective bodies, each of the lower edges of the blades constituting a cutting edge facing said forward end, the lower edge of each of the blades arranged at one side of the pipe being intersected at an outer point of the pipe by the lower edge of the corresponding blade symmetrically arranged at the other side of the pipe so that the said outer point is spaced apart, by a distance approximately less than the pipe diameter, from the outer surface of the pipe and lies in a plane which contains the axis of the pipe and divides the apparatus symmetrically into two equal parts, the lengths of said blades being successively reduced in proportion to the distance from the said forward end of the pipe to the respective portion to which the instant blade is attached, and connection means arranged, at the said forward end portion of the pipe, for connecting the apparatus to means for pulling the apparatus, whereby, when the apparatus is pulled along the bottom of the body of water by said means for pulling the apparatus, said lower edges of the respective blades dig successively into the material of the bottom in accordance with the arrangement order of the blades so as to dig a trench in the material, and at the same time, the cable guided through the pipe connected with the joint means is laid into the trench.

The novel features of this invention are set forth with particularity in the appended claims. This invention, however, as to its construction and operation together with advantages thereof, may best be understood by reference to the following description, taken in connection with the accompanying drawings in which the same or equivalent parts are designated by the same or similar reference numerals or characters, and in which

Figures 1, 2, 3:
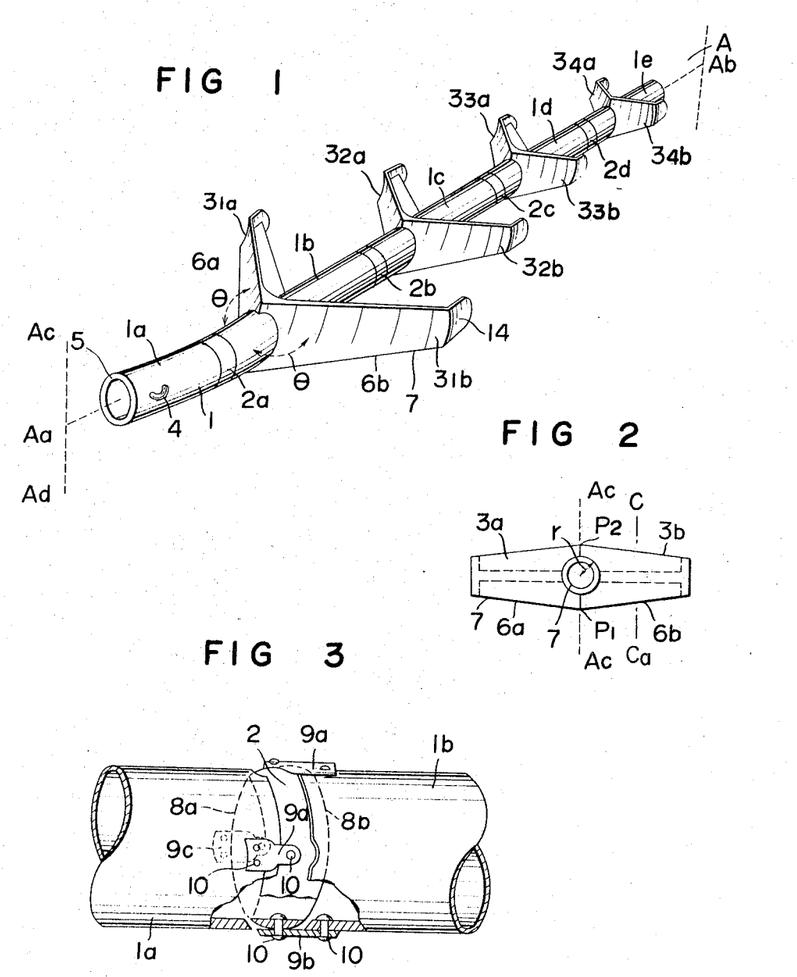
FIG. 1 is a perspective view of an embodiment of the cable laying and burying apparatus of this invention.
FIG. 2 is an end view of an embodiment of the cable laying and burying apparatus of this invention.
FIG. 3 is a perspective view (with parts cut away and partly in section) of an example of junction means employed in the apparatus of this invention.

The particular embodiment of this invention shown in FIG. 1, comprises a pipe 1, joint means 2, a plurality of pairs of plough blades 3 and connection means 4. The pipe 1 is employed for passing therethrough the cable or conduit to be laid and is composed of, with respect to the longitudinal direction thereof, a plurality of divided bodies 1a, 1b, 1c, 1d and 1e. The joint means 2 is composed of a plurality of flexible couplings 2a, 2b, 2c and 2d, each of which has an aperture to pass the cable or conduit, and are employed successively to connect said divided bodies 1a, 1b, 1c, 1d and 1e to one another. In laying a cable provided with repeaters inserted therein, each repeater having a diameter larger than that of the cable, the inner diameters of the pipe 1 and the flexible couplings 2a, 2b, . . . are so designed as to pass such repeaters. The blades 3 are composed of a plurality of pairs of blades ($3_{1a}$ and $3_{1b}$), ($3_{2a}$ and $3_{2b}$), ($3_{3a}$ and $3_{3b}$) and ($3_{4a}$ and $3_{4b}$), one blade and the other of each pair of which are respectively secured to the two sides of the respective divided body (1a, 1b, 1c, 1d or 1e) so as to be symmetrical to each other with respect to a plane A which contains the axis Aa–Ab of the pipe 1 and divides the pipe 1 into two equal parts. Each of the blades 3 has an angle of sweepback $\theta$ with respect to the pipe axis direction from the forward end 5 of the pipe 1, to the respective body (1a, 1b, 1c, 1d or 1e). Each of the lower edges 6a and 6b constitutes a cutting edge 7 facing said forward end 5 (FIG. 2). Each (i.e. 6a) of the lower edges of the blades 3 arranged at one side of the pipe 1 is intersected at an outer point $p_1$ (FIG. 2) of the pipe 1 by the lower edge (i.e. 6b) of the corresponding blade 3 arranged at the other side of the pipe 1 so that the said outer point $p_1$ is spaced apart, by a distance approximately less than the diameter 2r of the pipe 1, from the outer surface of the pipe 1 and lies in a plane A which contains the axis Aa–Ab of the pipe and divides the apparatus symmetrically into two equal parts. In an actual apparatus, it is preferable for effective construction and operation that this distance between the lower surface of the pipe and the surface of the pipe be smaller than the radius r of the pipe 1. The lengths of the blades are successively reduced in proportion to the distance from the said forward end 5 to the respective portion to which the instant blade ($3_{1a}$, $3_{1b}$, $3_{2a}$, $3_{2b}$, $3_{3a}$, $3_{3b}$, $3_{4a}$ or $3_{4b}$) is secured. The connection means 4 is arranged at the forward end portion 55 of the pipe 1 for connecting the apparatus to means for pulling the apparatus described hereinafter.

FIG. 3 illustrates particularly an example of the flexible coupling (2a, 2b, 2c or 2d), which comprises a ring 2 and two pairs of connectors (9a and 9b) and (9c and 9d). The ring 2 has two opposite ends 8a and 8b each of which has an outer diameter less than the inner diameter of the pipe 1 and is inserted a short distance into the end of a divided body (1a or 1b) to be connected. One and the other of each pair of the connectors are arranged so as to oppose to each other and to divide the ring into four parts approximately equal to one another. Each of the connectors (9a, 9b, 9c and 9d) is fixed to the ring 2 and respective divided body (1a or 1b) by means of fastening means, such as bolts 10 which are caulked. Accordingly, the divided bodies (1a and 1b) are connected to each other with some flexibility and without rotatability with respect to the axis of the pipe. An alternative construction of the coupling may be adopted provided that it satisfies the above conditions of connected state. For example, a parallel arrangement of woven wire rope may be secured by electric welding, and another material such as a plastic ring with reinforcing material, if necessary, may be employed provided that said other material has some flexibility and does not substantially have rotatability with respect to the axis of the ring.

FIG. 4 illustrates particularly an example of the pair of blades 3a and 3b. Each blade is supported by a supporting plate 12 disposed at the back thereof. It is desirable because of reasons stated below that the front surface of each blade be concave.

Figure 5A:
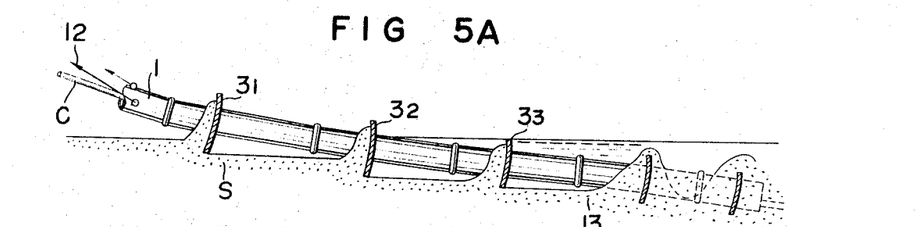
FIG. 5A is a side elevational view of the apparatus of this invention for description of the operation of the apparatus.
Figure 5B:
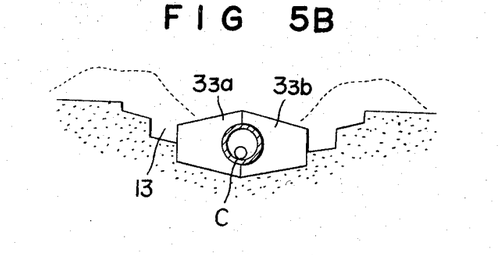
FIG. 5B is a vertical sectional view of the apparatus of this invention for description of the operation of the apparatus.

By the above described construction, the weight of the apparatus is substantially uniformly distributed over the lower edges 6 of all of the blades 3 when the apparatus is positioned on the bottom of the body of water. When the apparatus is pulled along the bottom of the body of water as illustrated in FIG. 5A by pulling means 12, the lower edges 6 of the respective blades ($3_1$, $3_2$, $3_3$, . . .) penetrate successively into the material, such as soil or sand, of the bottom in accordance with the arrangement order of the blades, and the material in front of each blade 3 is ploughed and scraped by the forward movement of the blade and is dozed along the front surface 11 of the blade 3 toward both side ends of the blade 3. Excavation and dozing operation by the blades is carried out simultaneously with respect to all of the blades 3, which have said successively reduced lengths and are secured to the pipe 1 with the angle of sweepback $\theta$. Accordingly, the material of the bottom is scraped with the passing of each blade 3, so that a new surface of the material appears each passing of a blade. A succeeding new surface of the material appears similarly with the passing of the succeeding blade. Material dug by a preceding blade is dozed laterally to the sides further from the apparatus than material dug by the succeeding blade. As a result of such operation, the trench becomes successively deeper and becomes narrower as it becomes deeper. The cable or conduit guided through the pipe 1 is simultaneously laid into the trench 13. FIG. 5B shows placement of blade $3_3$ (FIG. 5A) in the trench 13.

In actual cable laying operation, the material dug by blades 3 arranged near the rear end of the apparatus is not completely dozed outwardly from both side ends of the respective blades but partly overflows rearwardly over the upper edges of the blades as indicated in FIG. 5A since the spaces for accommodating windrows of the excavated material become progressively smaller in proportion to the depth of the trench 13. Accordingly, the rear end portion of the apparatus moves in a state of burial by the overflowing material. The cable or conduit, however, is fed out of the rear end of the apparatus, so that it is laid on the bottom of the trench 13 in a state of burial under the overflowing material.

In order to cause two blades arranged symmetrically to operate uniformly on the material, the side end 14 of each of the blades 3 may be bent toward the rear of the pipe 1 as shown in FIGS. 1 and 4. By the provision of these bent ends 14, the respective blades 3 are caused to dig substantially uniformly into the material of the bottom below the body of water even if the softness of the material is not uniform. Moreover, the bent ends 14 can prevent the apparatus from undergoing sinusoidal forward motion due to irregular digging action of the various blades. That is, the bent ends 14 function as stabilizers.

In the construction of a pair of blades 3, it is preferable, in order to facilitate digging of the blades 3 into the bottom material, to provide the lower edges 6 of the blades 3 with gradual outwardly ascending inclinations, as shown in FIGS. 2 and 5, whereby an obtuse V-shaped lower edge is formed by said edges 6 with a vertex at point ($p_1$). By this construction, the blades 3 dig effectively into the bottom material. The centre of the trench 13, however, is dug deeper than other portions because of this shape of the blades 3.

Figure 6:
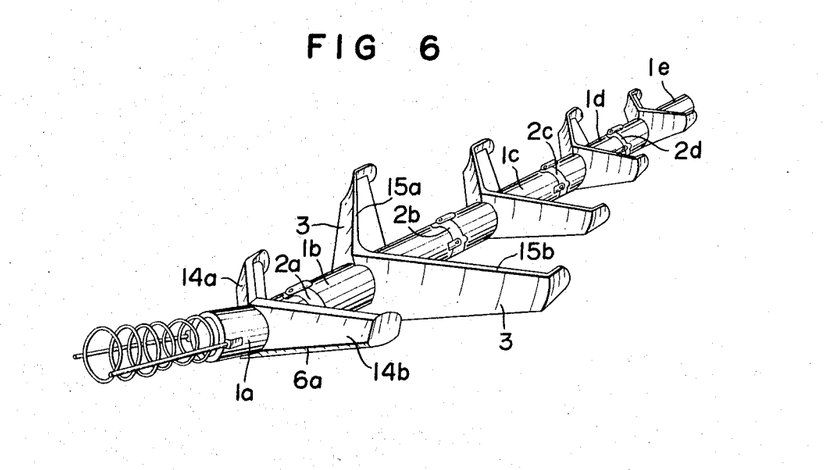
FIG. 6 is a perspective view of the apparatus with balance means and guide means according to this invention.

In order to maintain balance of the apparatus in its forward movement, the apparatus may be provided, nearer to the forward end 5 of the pipe 1 than the plurality pairs of blades 3, with a pair of blades 14a and 14b secured symmetrically to one of said divided bodies 1a with respect to the axis Aa–Ab of the pipe 1 as shown in FIG. 6. The further provided pair of blades 14a and 14b are arranged in alignment with the arrangement of the plurality of pairs of blades 3 and each having a lower edge 6a which is turned up toward the rear of the apparatus. Since the lower edges 6a of the further provided blades 14a and 14b do not dig into the bottom material below the body of water, the apparatus can be pulled in stable balance.

Figure 4A:
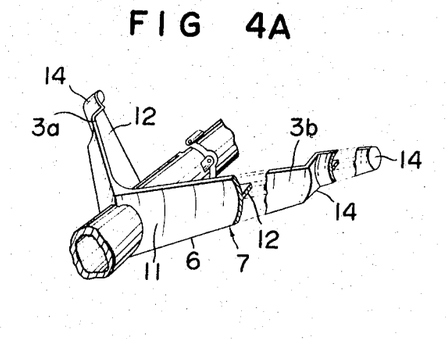
FIG. 4A is a perspective view (with parts cut away) of an example of a divided body with a pair of blades used in the apparatus of this invention.
Figure 4B:
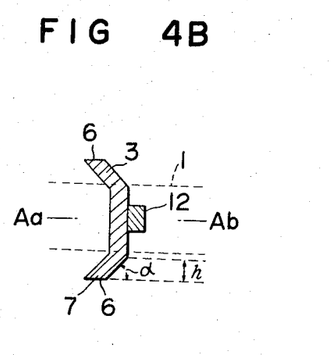
FIGS. 4B, 4C, and 4D are sectional views of examples of plough blades suitable for use in the apparatus of this invention.
Figure 4C:
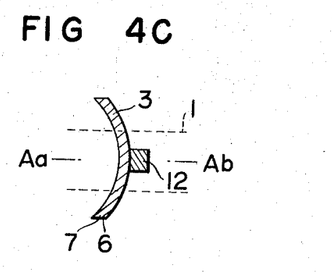
Figure 4D:
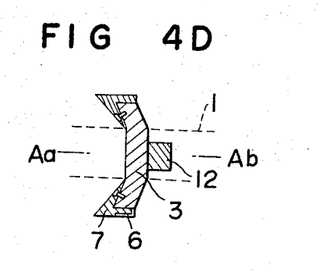

The front surface 11 of each of the wings 3 may be flat in case the lower (and upper) edges of the respective blades are bent froward. Excavation of the trench and removal of the excavated soil carried out by each blade 3, however, are effectively performed when the front surface 11 of each of the wings 3 is concave as shown in FIGS. 1, 4A, 5A and 6. FIGS. 4B, 4C and 4D illustrate sectional views of examples of the blade 3. The examples shown in FIGS. 4B and 4D have a flat portion and edges 6 bent forwardly, and particularly have cutting edges made of a hard metal, such as steel, in FIG. 4D. The example shown in FIG. 4C has a concave front surface. Reference characters α and h indicate values which are indicated hereinafter in Table 1.

If the bottom below the body of water has an irregular surface, the apparatus may turn upside down during its forward movement. Accordingly, it is desirable that the construction of the apparatus be symmetrical with respect to a horizontal plane which divides the appartus into upper and lower parts equal to each other. In this case, the upper edge 15 of each of the blades 3 arranged at one side of the pipe 1 is intersected at the outer point $p_2$ of the pipe 1 by the upper edge 15 of corresponding blade 3 symmetrically arranged at the other side of the pipe 1 so that the said outer point $p_2$ lies in a plane A (FIG. 1) which contains the axis Aa–Ab of the pipe 1 and symmetrically divides the apparatus. FIGS. 1, 2, 4 and 6 show examples of the blade 3 having such construction.

In these examples, each of the divided bodies 1a, 1b, . . . has only one pair of blades 3 or 14. However, any of the divided bodies can be provided with a plurality of pairs of blades 3 or 14. Moreover, the respective pairs of blades 3 may be secured alternately to the respective divided bodies 1a, 1b, . . . . This construction can be considered as being one in which each of the joint means 2 is composed of a plurality of flexible couplings connected successively to one another.

Figure 7A:
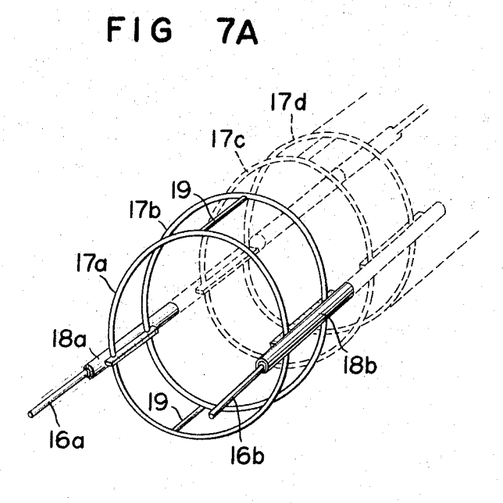
FIGS. 7A and 8A are fragmental perspective views of guide means of this invention.
Figure 7B:
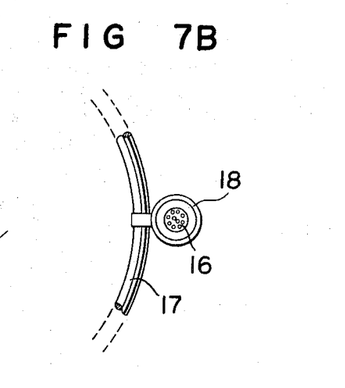
FIGS. 7B and 8B are fragmental elevational views (partly in section) of guide means of this invention.
Figures 8A, 8B:
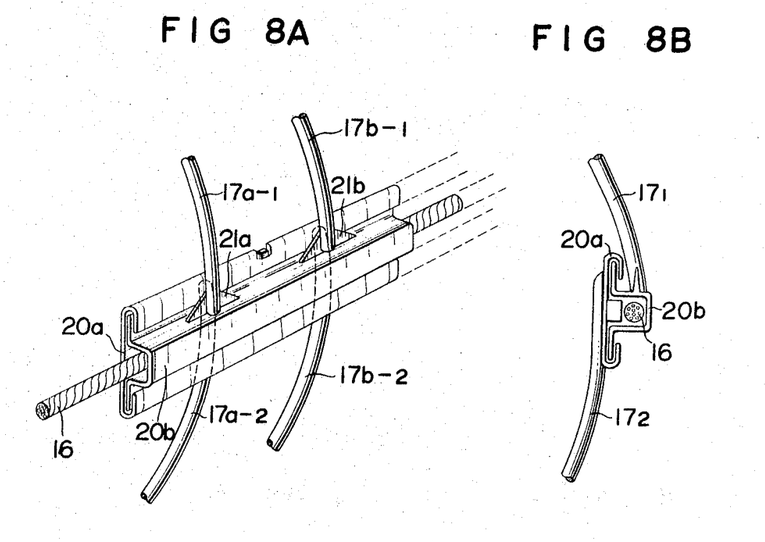

In laying the cable or conduit, it is necessary to provide the front end 5 of the apparatus with guide means for guiding the cable or conduit into the pipe 1. FIG. 7A shows one example of this guide means, and FIG. 6 shows the apparatus with this guide means. The guide means comprises two wire ropes 16a and 16b arranged in parallel to one another, each connected to the connection means 4 of the apparatus, and a plurality of rings 17a, 17b, 17c, . . . arranged, substantially in parallel to one another, successively along the two wire ropes 16a and 16b and supported by the two wire ropes. Each of the rings 17a, 17b is supported by two sleeves 18a and 18b through which the respective wire ropes 16a and 16b are threaded. If necessary, each of the sleeves may be cut into a plurality of parts. The rings 17a, 17b, . . . may be further braced by bars 19 as shown in FIG. 7A. Moreover, each of these rings 17a, 17b, . . . can be formed by the use of two parts which are coupled to each other. FIGS. 8A and 8B show a method of coupling the two parts of the rings 17a, 17b, . . . . The ends of the parts 17a–1 and 17b–1 are fixed respectively to triangular projections 21a and 21b on one coupling plate (20b), and the ends of the parts 17a–2 and 17b–2 are secured to the other coupling plate (20a). Electric welding is suitable for securing these parts. Heavy lines in FIG. 8B show portions of these joints. Two parts (17a–1 and 17a–2) or (17b–1 and 17b–2) secured to coupling plates 20a and 20b can be coupled by coupling these coupling plates 20a and 20b, as shown in FIGS. 8A and 8B, so as to be supported on the wire rope 16.

Figure 9A:
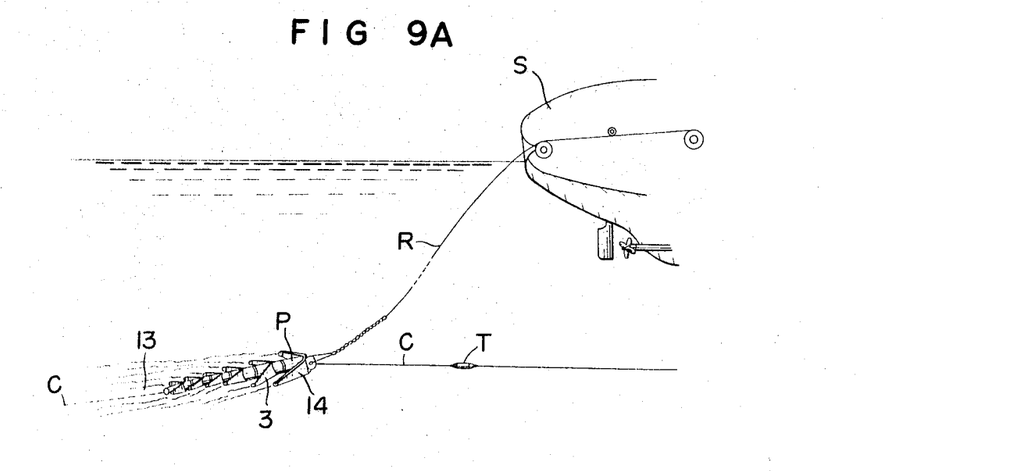
FIGS. 9A and 9B are perspective views for description of the cable laying and burying operation of the apparatus of this invention.

FIG. 9A indicates a practical method for burying a previously laid cable or conduit C. The cable laying and burying apparatus P of this invention is pulled, after a cable or conduit C has been threaded therethrough, by a rope R which is connected to a pulling device (for example, a ship S). In accordance with this cable laying and burying operation, the apparatus of this invention can be applied for burying a previously laid cable or conduit C below the surface of the bottom of the body of water.

Figure 9B:
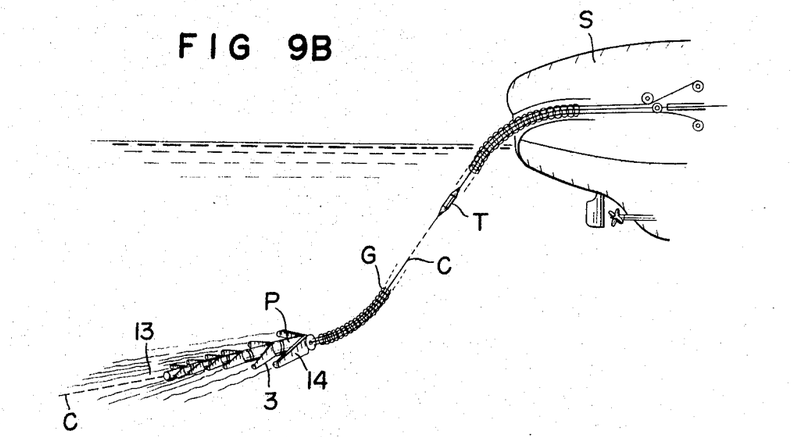
Figure 10A:
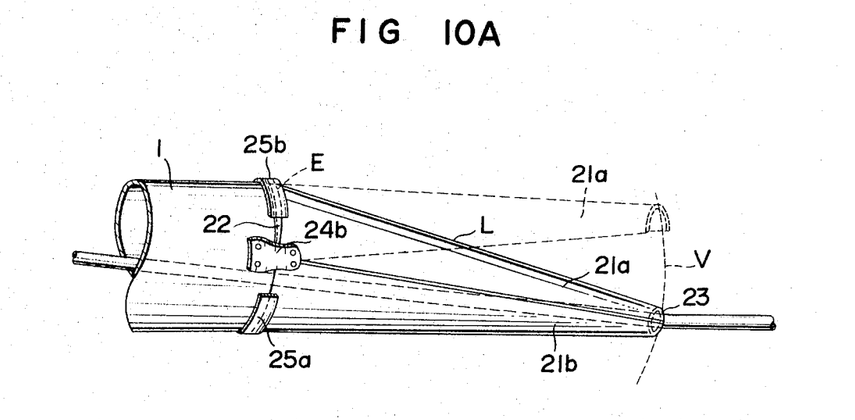
FIGS. 10A and 10B are perspective views, as viewed principally from the side and top, respectively, of press down means of this invention.
Figure 10B:
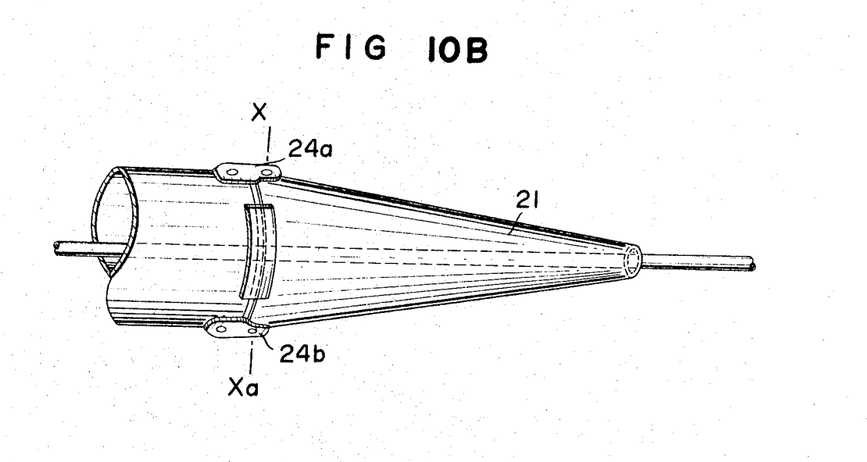

FIG. 9B shows a practical method for laying and burying the cable or conduit C. The cable laying and burying apparatus P of this invention is pulled by a guide means G mentioned above which is connected to a pulling device (for example, a ship S). The cable or conduit C to be laid is guided through the guide means G to the apparatus P and laid precisely in a trench 13 dug by the apparatus according to the above described cable burying operation. For accurate laying of the cable or conduit C in the trench 13, the apparatus P may be provided with means for pressing down the cable or conduit at the outlet (rear end) of the apparatus P. FIGS. 10A and 10B show one example of this means, which is composed essentially of a tube 21. This tube 21 has a conical surface and a large entrance opening end 22 and a small exit opening end 23, which are opposite each other. The tube 21 is split into two equal halves 21a and 21b along a plane containing the centres of the two opening ends 22 and 23. The large opening end 22 is connected, by two opposed connectors 24a and 24b arranged at the two sides of the rear ends of the apparatus P, to the rear end of the pipe 1 so that the equal parts 21a and 21b are arranged on the upper and lower sides of the apparatus P. The length L on the conical surface from the small opening end 23 to the large opening end 22 is gradually reduced in proportion to the distance the end E of the length L on the large opening end 22 recedes from said two connection points so that the small opening end 23 can be swung along a circular arc V about an axis X–Xa which contains the axis of the two opposed connectors. Since the small opening end 23 settles down by its own weight, the cable or conduit guided through the pipe 1 is accurately pressed down into the trench 13. Curved plates 25a and 25b are means for closing the gaps between the pipe 1 and the tube 21 so that soil or sand cannot infiltrate into the pipe 1. Moreover, the tube 21 can be opened, as shown in FIG. 10A by dotted line, in laying a cable so that cable repeaters with a relatively large diameter can be passed through the tube 21.

Figure 11:
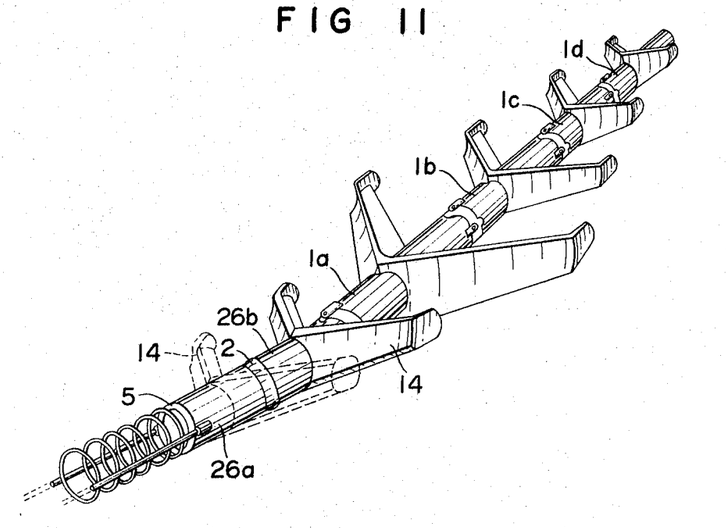
FIG. 11 is a perspective view of another embodiment of the apparatus of this invention.

In laying a cable or conduit C, it is necessary that the apparatus P be maintained at a proper attitude as illustrated in FIGS. 5A, 9A or 9B. The apparatus P is pulled with a large pulling force in laying the cable or conduit C. If the weight of the apparatus P is too small, the apparatus P cannot assume the proper attitude, and the forward end of the apparatus will rise. Accordingly, it is necessary that the apparatus P have an appropriate weight in comformity with the pulling force. Particularly, it is desirable that the forward end of the apparatus have a relatively large weight. For this purpose, the apparatus can provide, in addition to the plurality of divided bodies 1a, 2a, . . . body 26, as shown in FIG. 11. Each of the divided with a plurality of such divided bodies 26a, 26b, . . . has no blades 3, but may have blades 14 if necessary. The divided bodies 26a, 26b, . . . are connected successively to one another with flexible couplings, such as universal couplings, each of which has an aperture to pass the cable or conduit C. The plurality of divided bodies 26a, 26b, . . . are respectively connected forward of the bodies 1a, 2a, . . . each with the blades 3.

In the above description, the number of cables or conduits to be laid is one. This apparatus, however, is capable of laying a plurality of cables or conduits simultaneously provided that the plurality of cables or conduits can be supplied through the pipe 1.

As described above in detail, the cable laying and burying apparatus P of this invention is capable of effectively excavating a trench 13 and accurately laying a cable or conduit in the trench 13. Since excavation by each of the blades 3 is carried out with respect to a relatively thin layer of bottom material, the ditch 13 can be dug without much difficulty. The removed soil or sand is caused to fall into the trench 13, after the cable or conduit is laid, by natural forces such as tides or stream currents.

In the laying of a submerged cable or conduit, it is known that burial of the cable or conduit well below the surface of the bottom of bodies of water permits the use of more flexible and less expensive unarmoured or lightly armoured cable instead of the conventional heavily armoured submerged cable or conduit.

While the utility of the cable laying apparatus of this invention has been tested with respect to an example on a smaller scale than that of an actual apparatus, the tested apparatus can, of course, be actually used in laying cables suitable for this scale. The particulars and performance of this cable laying apparatus are indicated in the accompanying Tables 1 and 2.

TABLE 1.—PARTICULARS OF TESTED CABLE-LAYING APPARATUS

| | With seven pairs of plough blades | With six pairs of plough blades |
|---|---|---|
| Diameter of pipe (cm.) | 21.6 | 21.6 |
| Overall length (cm.) | 550 | 460 |
| Maximum span between tips of a pair of blades (cm.) | 120 | 90 |
| Height of apparatus (cm.) | 37.6 | 37.6 |
| Angle between each blade and pipe centerline (degrees) | 45 | 45 |
| Angle α (Fig. 4B) (degrees) | 30 | 30 |
| Height of cutting edge (cm.) | 8 | 8 |
| Total weight (kg.) | 620 | 525 |

TABLE 2.—PERFORMANCE OF TESTED CABLE-LAYING APPARATUS

| | Cable laying speed (knots) | Depth of trench (cm.) | Towing force (metric tons) |
|---|---|---|---|
| With seven pairs of plough blades | 0.8 | 43 | 1.95 |
| | 1.8 | 45 | 1.83 |
| With six pairs of plough blades | 0.6 | 39 | 1.54 |
| | 1.2 | 40 | 1.54 |
| | 2.2 | 43 | 1.58 |

As indicated in Table 2, the speed of travel of the apparatus in laying the cable or conduit C is much higher than that (800 feet per hour) of the conventional apparatus, and, moreover, it can be increased above the values shonwn in Table 2 provided that the apparatus has mechanical strength suitable for such higher speed. The depth of the trench 13 can be readily increased by increasing the number of pairs of the blades 3. As a result of our tests as shown previously, it is desirable for effective operation of this apparatus that the apparatus be so constructed that material shaved by the respective pairs of blades have volumes substantially equal to one another. In other words, it is preferable that a pair of blades 3 with a longer span length shave a material layer which is thinner than the material shaved by a pair of blades 3 with a shorter length.

Since it is obvious that many changes and modifications can be made in the above described details without departing from the nature and spirit of the invention, it is to be understood that the invention is not to be limited to the details described herein except as set forth in the appended claims.

What we claim is:
1. An apparatus for laying underwater cables, conduits, or the like comprising: a tubular structure adapted for passing therethrough at least one cable and composed, with respect to the longitudinal direction thereof, of a plurality of divided tube sections; joint means for successively connecting said divided tube sections to one another in a tandem row with flexible couplings each of which has an aperture to pass the cable and has some flexibility without rotatability with respect to the axis of the tubular structure; a plurality of pairs of plough blades, the blades of each pair of which are secured to respective sides of one of the divided tube sections so as to be symmetrical to each other with respect to a plane which contains the axis of the tubular structure and divides the tubular structure into two equal parts, each of the plurality of blades having an angle of sweepback with respect to the axis of its respective tube section, each of the lower edges of the blades constituting a cutting edge facing the forward end of the tubular structure, the lower edge of each of the blades arranged on one side of the tubular structure being intersected at a point outside of the tubular structure with the lower edge of the corresponding blade symmetrically arranged on the other side of the tubular structure so that said point is offset, by a distance less than the diameter of the tubular structure, from the outer surface of the tubular structure and lies in a plane which contains the axis of the tubular structure and divides the apparatus symmetrically into two equal parts, the lengths of said blades being successively reduced in proportion to the distances of the blades from the forward end of the tubular structure; and connection means disposed, at the forward end of the tubular structure for connecting the apparatus to means for towing the apparatus, whereby when the apparatus is towed along the bottom of a body of water by said means for towing the apparatus, said lower edges of the blades dig successively into the material of the bottom in accordance with the arrangement order of the blades so as to dig a trench in the material, and, at the same time, the cable guided through the tubular structure is laid in the trench.

2. The apparatus according to claim 1, in which the front surface of each of the plough blades is concave as viewed in cross section.

3. The apparatus according to claim 1, in which the front surface of each of the plough blades is composed of a flat portion and a lower cutting edge turned toward the forward direction of the apparatus.

4. The apparatus according to claim 1, in which each of said flexible couplings comprises a universal coupling.

5. The apparatus according to claim 1, in which each of said flexible couplings comprises a plurality of universal couplings connected successively to one another.

6. The apparatus according to claim 1, in which the lower edges of each pair of the blades are inclined upwardly from their point of intersection toward the outer tips of the blades.

7. The apparatus as claimed in claim 1, in which the apparatus is further provided, in addition to the plurality of divided tube sections, with a plurality of such divided tube sections connected successively to one another with flexible couplings each of which has an aperture to pass the cable, the plurality of divided tube sections further provided being connected between one of the tube sections with connection means and another of the tube sections with the blade placed adjacently to said one end.

8. The apparatus as claimed in claim 1, in which the apparatus is further provided, near the forward end of the tubular structure and forward of the plurality of blades, with at least one pair of blades secured symmetrically to one of said divided tube sections with respect to the axis of the tubular structure, the further provided pair of blades being arranged in alignment with the arrangement of the plurality of pairs of blades and each having lower edges which are turned up toward the rear of the apparatus.

9. The apparatus as claimed in claim 1, in which the apparatus is provided at the rear end thereof with a conical tube with large and small opposite opening ends, which tube is divided into two equal parts by a horizontal plane passing through the centers of the two opening ends, the large opening end of the tube being connected by two opposed connectors arranged on the two sides of the large opening end to the rear end of the tubular structure so that said equal parts are arranged on the upper and lower sides of the apparatus, the length of the conical surface from the small opening end to the large opening end being gradually reduced in proportion to the distance of that point on the large opening end at which the length is measured recedes from said two connection points so that the small opening end can be swung in a circular arc about an axis which passes through the two opposed connectors.

10. The apparatus as claimed in claim 9, in which the apparatus is provided with means for closing gaps between the tubular structure and the conical tube.

11. The apparatus as claimed in claim 1, in which the apparatus is provided at the front end thereof with guide means for guiding the cable into the forward end of the tubular structure, said guide means comprising a plurality of wire ropes arranged in parallel to one another and each connected to said connection means of the apparatus, and a plurality of rings arranged, substantially in parallel to one another, successively along the plurality of wire ropes and supported by the plurality of wire ropes, whereby the cable is guided successively through the plurality of rings into the tubular structure.

12. The apparatus as claimed in claim 11, in which each of said rings is composed of two parts which are coupled to each other.

13. An apparatus for laying underwater cables, conduit, and the like in sub-bottom emplacement comprising: a tubular structure adapted for passing therethrough at least one cable and composed, with respect to the longitudinal direction thereof, of a plurality of divided tube sections; joint means for successively connecting said divided tube sections to one another in a tandem row with flexible couplings each of which has an aperture to pass the cable and has some flexibility without rotatability with respect to the axis of the tubular structure; a plurality of pairs of plough blades, the blades of each pair of which are secured to respective sides of one of the divided tube sections so as to be symmetrical to each other with respect to a plane which contains the axis of the tubular structure and divides the tubular structure into two equal parts, each of the plurality of blades having an angle of sweepback with respect to the axis of its respective tube section, each of the lower edges of the blades constituting a cutting edge facing the forward end of the tubular structure, the lower and upper edges of each of the blades arranged on one side of the tubular structure being intersected at two points outside of the tubular structure, respectively, by the lower and upper edges of the corresponding blade symmetrically arranged on the other side of the tubular structure so that the said outside points are each offset, by a distance less than the diameter of the tubular structure, from the outer surface of the tubular structure and lies in a plane which contains the axis of the tubular structure and divides the apparatus symmetrically into two equal parts, the lengths of said blades being successively reduced in proportion to the distances of the blades from the forward end of the tubular structure; and connection means arranged at the forward end portion of the tubular structure for connecting the apparatus to means for towing the apparatus, whereby when the apparatus is towed along the bottom of a body of water by said means for towing the apparatus, said lower edges of the blades dig successively into the material of the bottom of the body of water in accordance with the arrangement order of the blades so as to dig a trench in the material, and, at the same time, the cable guided through the tubular structure is laid in the trench.

14. The apparatus according to claim 13, in which the front surface of each of the plough blades is concave as viewed in cross section.

15. The apparatus according to claim 13, in which the front surface of each of the plough blades is composed of a flat portion and a lower cutting edge turned toward the forward direction of the apparatus.

16. The apparatus according to claim 13, in which each of said flexible couplings comprises a universal coupling.

17. The apparatus according to claim 13, in which each of said flexible couplings comprise a plurality of universal couplings connected successively to one another.

18. The apparatus according to claim 13, in which the lower edges of each pair of the blades are inclined upwardly from their point of intersection toward their outer tips.

19. The apparatus as claimed in claim 13, in which the apparatus is further provided, in addition to the plurality of divided tube sections, with a plurality of such divided tube sections connected successively to one another with flexible couplings each of which has an aperture to pass the cable, the plurality of divided tube sections further provided being connected between one of the tube sections with connection means and another of the tube sections with the blade placed adjacently to said one end.

20. The apparatus as claimed in claim 13, in which the apparatus is further provided, near the forward end of the tubular structure and forward of the plurality of blades, with at least one pair of blades secured symmetrically to one of said divided tube sections with respect to the axis of the tubular structure, the further provided pair of blades being arranged in alignment with the arrangement of the plurality of pairs of blades and each having lower edges which are turned up toward the rear of the apparatus.

21. The apparatus as claimed in claim 13, in which the outer side end of each of the blades is bent toward the rearward direction.

22. The apparatus as claimed in claim 13, in which the apparatus is provided at the rear end thereof with a conical tube with large and small opposite opening ends, which tube is divided into two equal parts by a horizontal plane passing through the centers of the two opening ends, the large opening end of the tube being connected by two opposed connectors arranged on the two sides of the large opening end, to the rear end of the tubular structure so that said equal parts are arranged on the upper and lower sides of the apparatus, the length of the conical surface from the small opening end to the large opening end being gradually reduced in proportion to the distance of that point on the large opening end at which the length is measured recedes from said two connection points so that the small opening end can be swung in a circular arc about an axis which pass through the two opposed connectors.

23. The apparatus as claimed in claim 22, in which the apparatus is provided with means for closing gaps between the tubular structure and the conical tube.

24. The apparatus as claimed in claim 13, in which the apparatus is provided at the front end thereof with guide means for guiding the cable into the forward end of the tubular structure, said guide means comprising a plurality of wire ropes arranged in parallel to one another and each connected to said connection means of the apparatus, and a plurality of rings arranged, substantially in parallel to one another, successively along the plurality of wire ropes and supported by the plurality of wire ropes, whereby the cable is guided successively through the plurality of rings to the tubular structure.

25. The apparatus as claimed in claim 24, in which each of said rings is composed of two parts which are coupled to each other.

26. An apparatus for laying underwater cables, conduits, and the like in sub-bottom emplacement comprising: a tubular structure adapted for passing therethrough at least one cable and composed, with respect to the longitudinal direction thereof, of a plurality of divided tube sections; joint means for successively connecting said divided tube sections to one another in a tandem row with flexible couplings each of which has an aperture to pass the cable and has some flexibility without rotatability with respect to the axis of the tubular structure; a plurality of pairs of plough blades, the blades of each pair of which are secured to respective sides of one of the divided tube sections so as to be symmetrical to each other with respect to a plane which contains the axis of the tubular structure and divides the tubular structure into two equal parts, each of the plurality of blades having an angle of sweepback with respect to the axis of its respective tube section, each of the lower edges of the blades constituting a cutting edge facing the forward end of the tubular structure, the lower edge of each of the blades arranged on one side of the tubular structure, being intersected at a point outside of the tubular structure by the lower edge of the corresponding blade symmetrically arranged on the other side of the tubular structure so that the said outside point is offset, by a distance less than the diameter of the tubular structure, from the outer surface of tubular structure and lies in a plane which contains the axis of the tubular structure and divides the apparatus symmetrically into two equal parts, the lengths of said blades being successively reduced in proportion to the distances of the blades from the forward end of the tubular structure, the outer side end of each of the blades being bent toward the rearward direction; and connection means arranged at the forward end portion of the tubular structure for connecting the apparatus to means for towing the apparatus, whereby when the apparatus is towed along the bottom of a body of water by said means for towing the apparatus, said lower edges of the blades dig successively into the material of the bottom of the body of water in accordance with the arrangement order of the blades so as to dig a trench in the material, and, at the same time, the cable guided through the tubular structure is laid in the trench.

References Cited

UNITED STATES PATENTS

| 2,144,063 | 1/1939 | Irvin | 61—72.4 |
| 2,875,585 | 3/1959 | Little | 61—72.4 |

FOREIGN PATENTS

| 1,222,669 | 1/1960 | France. |
| 1,270,097 | 7/1961 | France. |

EARL J. WITMER, *Primary Examiner.*